March 1, 1966 N. I. KALLMAN ETAL 3,237,260
CLAMPING DEVICE
Filed May 4, 1964
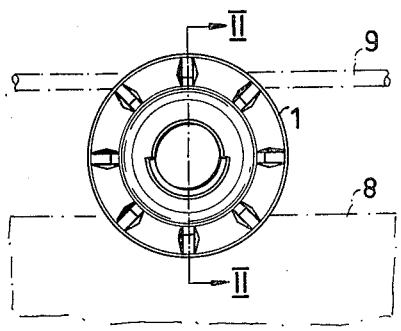
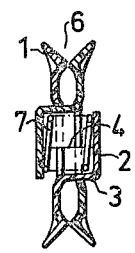
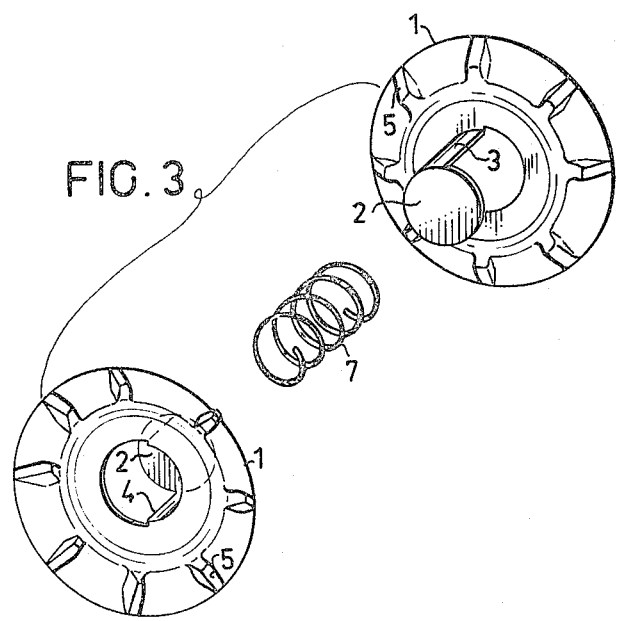
Nils Isak Kallman
Nils Enar Soren Tinnsten
INVENTORS
BY
Pierce Scheffler & Parker
Attorneys

United States Patent Office 3,237,260
Patented Mar. 1, 1966

3,237,260
CLAMPING DEVICE
Nils Isak Kallman, Husaby, and Nils Enar Soren Tinnsten, Gotene, Sweden, assignors to Industriaktiebolaget Bröderna Larsson, Gotene, Sweden, a corporation of Sweden
Filed May 4, 1964, Ser. No. 364,593
Claims priority, application Sweden, May 8, 1963, 5,070/63
1 Claim. (Cl. 24—137)

The present invention relates to a clamping device meant to be used as a clothes-pin, paper-clip or the like. Like earlier known devices of the kind the inventive clamping device consists of two identical halves facing each other and kept together by aid of a spring. The feature characterizing the clamping device is that each half comprises a disc with circular, polygonal or similar symmetrical or non-symmetrical form, that a hollow, countersunk spring-box means with a semi-cylindrical or semi-prismatic form and axially extending guiding surfaces for the corresponding part of the spring-box means of the opposing disc is provided at the central part of said disc and that one or several compression springs are arranged between the inner end walls of said spring-box means, said two spring-box means together forming a unit which is fully closed towards the space between said disc to prevent contact between the enclosed spring or springs and the clamped object.

Projections forming teeth are equally spaced round the periphery of the sides of the discs facing one another and therefore an object can be clamped at any part of the periphery of the clamping device. Said teeth can be bevelled towards the periphery of said disc so that it is only necessary to press the edge of the clamping device against the object so as to open the space between the discs in order to achieve the clamping.

One great advantage of the clamping device is that the compression spring is protected in the spring-box so that rust spots and the like do not soil the object.

Further advantages of the invention will be evident from the following description with reference to the accompanying drawing in which FIG. 1 is a side view of a clamping device according to the invention, FIG. 2 is a section on the line II—II in FIG. 1 and FIG. 3 shows the parts of the clamping device in an exploded view.

The clamping device comprises two identical discs 1 of plastic or another easily formable material, said discs in the embodiment shown being circular. The discs can, however, be formed as regular polygons or have another symmetrical or non-symmetrical form. The outer side of the disc is preferably plane and is provided with a depression with a circular bottom part 2 and the side wall 3 thereof is cut away along half the circumference. The axial edges 4 of the side wall 3 form guiding surfaces for the corresponding edges of the opposing disc. A number of teeth 5 are provided round the peripheries of the sides of the discs 1 facing one another, said teeth being so spaced that they are positioned straight in front of the corresponding teeth 5 on the opposing discs and said teeth are preferably bevelled towards the outer edge of said disc, so that a wedge-formed space 6 is formed outside the contact surface of said teeth. The distance between said teeth 5 from one another and the form of same are adapted in such a way that straight channels are formed tangentially inside said teeth in such a manner that a line can easily be gripped and retained.

When the clamping device is assembled one or several compression springs 7 are placed in the depression of one of the discs 1 and the bottom parts 2 of both discs are inserted through the slit formed by the cut away part of the side wall 3 on the other disc in such a way that the bottom parts serve as abutments for the ends of the compressed spring 7. Thus the side walls 3 together form a closed spring-box, the two halves thereof being axially displaceable relative to one another along the guiding surfaces 4, which prevent relative rotation of the discs. The spring 7 can preferably consist of one or several coil springs, but springs of another form can be used.

By pressure with the fingers against the outer sides of the bottom parts 2 the spring or springs 7 are compressed and a gap is formed between the discs around the spring-box. In this position any part of the circular gap can be brought over an object and by releasing the pressure on the spring said object will be clamped. The suspension of an object 8 (FIG. 1) on a line 9 can for instance be performed in that the clamping device first is clamped over the edge of the object in accordance with the above and the edge of the clamping device thereafter is pressed against the line, the gap thereby being automatically opened and closed around the line without having to compress the spring with the fingers as said discs can be inclined relative to one another. It is thus very easy to perform the fastening even when it is impossible to follow the same with the eyes.

If desired the clamping device can be provided with a suspension loop fastened to the center of one or both bottom parts 2 of the spring-box. By the fact that the conventional lever principle has been avoided and the clamping device can grip in all points along the periphery of same, several objects can be suspended by the same clamping device and as the spring-box always is closed towards the gap between the discs, contact between the objects and the spring is prevented.

What is claimed is:

A clamping device comprising a pair of substantially identical halves having inwardly directed clamping surfaces normally retained in juxtaposed confronting position in contact with each other by the aid of spring means and movable away from one another against the action of said spring means, each of said halves comprising a member of disc like configuration having a generally hollow depressed spring retainer housing projecting outwardly from the center portion of the inner surface of each of said discs and having an inner end wall and having axial guiding surfaces which cooperate with each other to prevent rotation of the discs relative to each other, said spring means being confined between the inner end walls of said spring retaining housing, said spring retaining housings together forming a spring retainer which is fully closed towards the gap between said disc like members so that contact between the spring means therein and a clamped object is prevented, said end walls being movable toward each other by finger pressure applied thereto to release the clamping surfaces from each other.

References Cited by the Examiner

UNITED STATES PATENTS

| 696,272 | 3/1902 | Rodman. |
| 1,481,978 | 1/1924 | Bice. |
| 1,608,022 | 11/1926 | Hanson _____ 24—127 |
| 2,176,708 | 10/1939 | Douglas _____ 24—66 X |
| 2,886,871 | 5/1959 | Urich. |

FOREIGN PATENTS 145,439  2/1952  Australia.

WILLIAM FELDMAN, *Primary Examiner.*

D. GRIFFIN, *Assistant Examiner.*